(12) United States Patent
Chopra et al.

(10) Patent No.: US 9,624,389 B2
(45) Date of Patent: Apr. 18, 2017

(54) DUAL COMPONENT INKS COMPRISING REACTIVE LATEXES FOR INDIRECT PRINTING

(71) Applicant: XEROX CORPORATION, Norwalk, CT (US)

(72) Inventors: Naveen Chopra, Oakville (CA); Daryl W. Vanbesien, Burlington (CA); Barkev Keoshkerian, Thornhill (CA); Michelle N. Chrétien, Mississauga (CA); Marcel P. Breton, Mississauga (CA); Jennifer L. Belelie, Oakville (CA); Jenny Eliyahu, Maple (CA)

(73) Assignee: XEROX CORPORATION, Norwalk, CT (US)

( * ) Notice: Subject to any disclaimer, the term of this patent is extended or adjusted under 35 U.S.C. 154(b) by 329 days.

(21) Appl. No.: 14/067,290

(22) Filed: Oct. 30, 2013

(65) Prior Publication Data

US 2015/0116430 A1 Apr. 30, 2015

(51) Int. Cl.
| | |
|---|---|
| C09D 11/104 | (2014.01) |
| B41J 2/01 | (2006.01) |
| B41M 5/025 | (2006.01) |
| C09D 11/102 | (2014.01) |
| C09D 11/30 | (2014.01) |

(52) U.S. Cl.
CPC ........... *C09D 11/104* (2013.01); *B41J 2/01* (2013.01); *B41M 5/0256* (2013.01); *C09D 11/102* (2013.01); *C09D 11/30* (2013.01); *B41J 2002/012* (2013.01)

(58) Field of Classification Search
None
See application file for complete search history.

(56) References Cited

U.S. PATENT DOCUMENTS

| | | | |
|---|---|---|---|
| 4,840,674 A | 6/1989 | Schwarz | |
| 5,281,261 A | 1/1994 | Lin | |
| 5,531,818 A | 7/1996 | Lin | |
| 5,693,129 A | 12/1997 | Lin | |
| 5,700,851 A * | 12/1997 | Banning | C08G 18/0804 347/100 |
| 6,034,154 A * | 3/2000 | Kase | C08G 18/0823 260/DIG. 38 |

(Continued)

OTHER PUBLICATIONS

U.S. Appl. No. 14/067,469, filed Oct. 30, 2013, entitled "Inkjet Ink Containing Polystyrene Copolymer Latex Suitable for Indirect Printing"; First Inventor: Jenny Eliyahu.

(Continued)

*Primary Examiner* — Gerard Higgins
*Assistant Examiner* — Sathavaram I Reddy
(74) *Attorney, Agent, or Firm* — Pillsbury Winthrop Shaw Pittman LLP

(57) ABSTRACT

An ink comprising a first reactive latex having a first crosslinkable functional group and a second reactive latex a second crosslinkable functional group, wherein the first reactive latex can react with the second reactive latex to form a cross-linked polymer matrix when in contact with each other, wherein the first reactive latex and the second reactive latex are not in contact with each other, which is suitable for use in an indirect printing method, and a method of printing using the ink.

18 Claims, 1 Drawing Sheet

(56) References Cited

U.S. PATENT DOCUMENTS 8,334,026 B2 12/2012 Chretien
2012/0075381 A1* 3/2012 Wachi .................. C09D 171/02
347/20

OTHER PUBLICATIONS

U.S. Appl. No. 14/067,074, filed Oct. 30, 2013, entitled "Electron Beam Curable Inks for Indirect Printing"; First Inventor: Michelle N. Chretien.
U.S. Appl. No. 14/067,054, filed Oct. 30, 2013, entitled Photocurable Inks for Indirect Printing; First Inventor: Michelle N. Chretien.
U.S. Appl. No. 14/067,152, filed Oct. 30, 2013, entitled "Curable Aqueous Latex Inks for Indirect Printing"; First Inventor: Jennifer L. Belelie.
U.S. Appl. No. 14/067,240, filed Oct. 30, 2013, entitled "Emulsified Aqueous Ink Comprising Reactive Alkoxysilane for Indirect Printing"; First Inventor: Naveen Chopra.
U.S. Appl. No. 14/067,325, filed Oct. 30, 2013, entitled "Emulsified Curable Inks for Indirect Printing"; First Inventor: Daryl W. Vanbesien.
U.S. Appl. No. 14/067,443, filed Oct. 30, 2013, entitled "Emulsified Electrorheological Inks for Indirect Printing"; First Inventor: Naveen Chopra.
U.S. Appl. No. 14/066,716, filed Oct. 30, 2013, entitled "Ink Jet Ink for Indirect Printing Applications"; First Inventor: Jenny Eliyahu.
Soucek et al, J. Coat Technol. 73 (2001), 117-125.

* cited by examiner

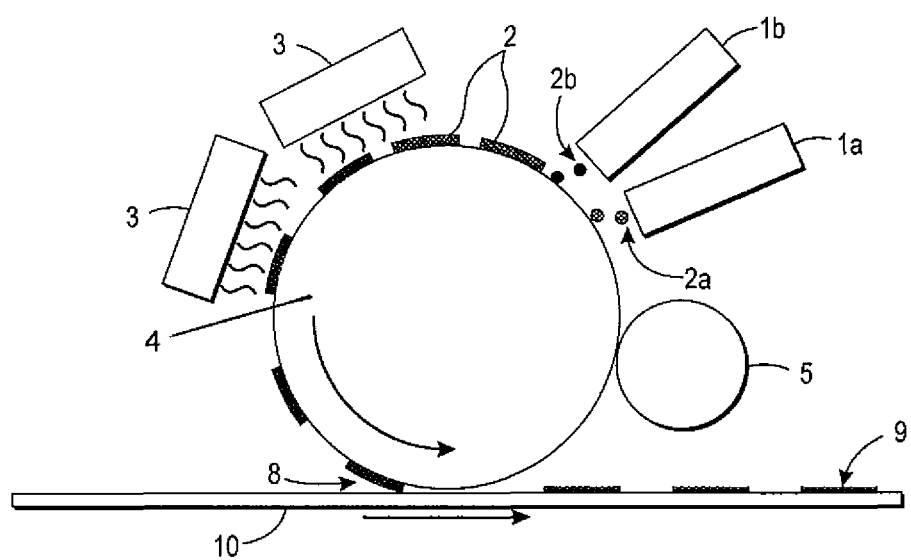

DUAL COMPONENT INKS COMPRISING REACTIVE LATEXES FOR INDIRECT PRINTING

INTRODUCTION

The presently disclosed embodiments are related generally to a dual component ink compositions comprising a first reactive latex and a second reactive latex for indirect printing method, an indirect printing system employing the ink thereof, and method of printing thereof.

Indirect printing process is a two-step printing process wherein the ink is first applied imagewise onto an intermediate receiving member (drum, belt, etc.) using an inkjet printhead. The ink wets and spreads onto the intermediate receiving member to form a transient image. The transient image then undergoes a change in properties (e.g., partial or complete drying, thermal or photo-curing, gelation etc.) and the resulting transient image is then transferred to the substrate.

Inks suitable for such indirect printing process may be designed and optimized to be compatible with the different subsystems, such as, jetting, transfer, etc., that enable high quality printing at high speed. Typically, inks that display good wettability do not efficiently transfer onto a final substrate, or conversely inks that transfer efficiently to the substrate do not wet the intermediate receiving member. To date, there appears to be no commercially available ink that enables both the wetting and the transfer functions.

Thus, there exists a need to develop an ink suitable for indirect printing process, and particularly, there exists a need to develop an ink that exhibits good wetting of the intermediate receiving member and is capable of efficient transfer to the final substrate.

Each of the foregoing U.S. patents and patent publications are incorporated by reference herein in their entirety. Further, the appropriate components and process aspects of the each of the foregoing U.S. patents and patent publications may be selected for the present disclosure in embodiments thereof.

SUMMARY

According to embodiments illustrated herein, there is provided a dual component ink for use in an indirect printing process comprising: a first reactive latex having a first crosslinkable functional group; and a second reactive latex having a second crosslinkable functional group, wherein the first reactive latex can react with the second reactive latex to form a cross-linked polymer matrix when in contact with each other, wherein the first reactive latex and the second reactive latex are not in contact with each other; and further wherein the total reactive latexes are present in an amount of from about 3 to about 20 weight percent based on the total weight of the ink.

The present embodiments also provide an indirect printing system comprising an intermediate receiving member for receiving jetted ink; a holding arrangement for holding a dual-component ink adjacent to the intermediate receiving member, wherein the dual-component ink comprises a first component comprising a first reactive latex having a first crosslinkable functional group and a second component comprising a second reactive latex a second crosslinkable functional group, and the holding arrangement further comprises a first container for holding the first component and a second container for holding the second component; one or more inkjet nozzles formed in contact with the first and second containers for jetting the dual-component ink, so that both the first and second components are jetted onto the intermediate receiving member and mixed to react the first reactive latex with the second reactive latex to form a cross-linked polymer matrix; and a heater device for heating the cross-linked polymer matrix.

In certain embodiments, there is provided An indirect printing system comprising an intermediate receiving member for receiving jetted ink; a holding arrangement for holding a dual-component ink adjacent to the intermediate receiving member, wherein the dual-component ink comprises a first component comprising a first reactive latex having a first crosslinkable functional group and a second component comprising a second reactive latex a second crosslinkable functional group, and the holding arrangement further comprises a first container for holding the first component and a second container for holding the second component; one or more inkjet nozzles formed in contact with the first and second containers for jetting the dual-component ink, so that both the first and second components are jetted onto the intermediate receiving member and mixed to react the first reactive latex with the second reactive latex to form a cross-linked polymer matrix; and a heater device for heating the cross-linked polymer matrix.

BRIEF DESCRIPTION OF THE DRAWINGS

For a better understanding of the present embodiments, reference may be made to the accompanying figures.

FIG. 1 is a diagrammatical illustration of an imaging member in accordance with the present embodiments for applying a two-step transfer and curing process in an indirect printing system.

DETAILED DESCRIPTION

In the following description, it is understood that other embodiments may be utilized and structural and operational changes may be made without departure from the scope of the present embodiments disclosed herein.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3 or the ARES mechanical spectrometer, both made by Rheometrics, a division of TA Instruments.

Disclosed herein is a dual-component ink comprises a first component comprising a first reactive latex having a first crosslinkable functional group and a second component comprising a second reactive latex a second crosslinkable functional group, which is suitable for an indirect print process, or indirect printing ink jet applications. The ink of the present embodiments may possess the required surface tension (in the range of 15-50 mN/m), viscosity (in the range of 3-20 cps), and particle size (<600 nm) for use in an inkjet (e.g., piezoelectric) printhead.

In embodiments, the ink has a surface tension of from about 15 mN/m to about 50 mN/m, for example from about 20 mN/m to about 40 mN/m, or from about 20 mN/m to about 30 mN/m. The surface tension can be measured with a tensiometer instrument, such as the one from Krüss.

In embodiments, the ink has a viscosity of from about has a viscosity of from about 2 cps to about 20 cps, for example from about 3 cps, to about 15 cps, or from about 4 cps to about 12 cps, at the temperature of jetting. In particular embodiments, the ink compositions are jetted at temperatures of less than about 100° C., such as from about 25° C. to about 100° C., or from about 30° C. to about 95° C., such as from about 30° C. to about 90° C.

In embodiments, the ink has an average emulsion droplet size of less than about 600 nm, for example from about 25 nm to about 500 nm, or from about 50 nm to about 300 nm. The droplet size can be determined by dynamic light scattering.

FIG. 1 discloses a diagrammatical illustration of an imaging system in accordance with the present embodiments for applying a two-step transfer whereby an ink of the present disclosure is printed onto an intermediate transfer surface for subsequent transfer to a receiving substrate. During the indirect print process, the ink of the present embodiments 2 is jetted and spread onto an intermediate receiving member 4 via two inkjets 1a and 1b. The ink of the present embodiments comprises two reactive latexes, where the first reactive latex 2a is jetted via inkjet 1a, and the second reactive latex 2b is jetted via inkjet 1b. The first and second reactive latexes may be applying onto an intermediate receiving member 4, and subsequently mixed together on the intermediate receiving 4. The intermediate receiving member 4 may be provided in the form of a drum, as shown in FIG. 1, but may also be provided as a web, platen, belt, band or any other suitable design.

Referring again to FIG. 1, the ink of the present embodiments 2 containing a mixture of the first and second reactive components 2a and 2b may be heated by a heater device 3 to remove the water content (partially or fully) in the ink vehicle of ink 2, and the reactive components react with one another to form a cross-linked matrix. The cross-linked matrix may be formed during, and/or after the evaporation of the water content in the ink vehicle of ink 2. The remaining water portion of the ink vehicle, if any, may continue to be removed via heat by the heater device 3 leaving a solid ink film (ink image 8) behind. The ink image 8 is then transferred from the intermediate receiving member 4 to the final receiving substrate 10 to form the final image 9. The transfer of the ink image may be performed through contact under pressure. A cleaning roll 5 is in contact with the receiving member 4. Image robustness is especially important for packaging applications such as folding carton, for example.

An ink suitable for an indirect printing process should be able to wet the intermediate receiving member 4 to enable formation of the transient image 2, and undergo a stimulus induced property change to form image 8 to enable release from the intermediate receiving member 4 in the transfer step.

Reactive Latexes

The ink of the present embodiments comprises a dual component, where one of the components includes a first reactive latex having a first crosslinkable functional group and the other includes a second reactive latex a second crosslinkable functional group. The two components can be packaged in a way that they are not in contact with each other. Each component includes a reactive material that can undergo crosslinking or polymerization when mixed with the other component. Furthermore, each of the reactive components may undergo reaction in contact with the emulsion continuous phase (the water) to form a thin coating or skin within the emulsion, and further reaction may take place when the two emulsified components are intermixed and mechanical pressure is applied to 'rupture' the protective skin layers surrounding each emulsified droplet of reactive component. The first reactive latex can react with the second reactive latex to form a cross-linked polymer matrix when in contact with each other. The cross-linked polymer matrix can be a polyurethane, a phenol-methanal, an urea-formaldehyde, a melamine-formaldehyde, or an epoxide.

The mole ratio of the first reactive latex to the first reactive latex can vary continuously from about 0.5:1 to about 2:1, from about 0.5:1 to about 1:1, or from about 1:1 to about 2:1.

Polyurethane

In embodiments, the cross-linked polymer matrix includes a polyurethane. One of the first and second reactive latexes may include a polyol and the other one of the first and second reactive latexes may include a diisocyanate.

Examples of polyol include alkylene glycol, such as ethylene glycol, di-, tri-, tetra-, penta-ethylene glycol and higher (poly)ethylene glycols. Also propylene glycol, di-, tri-, tetra-, and penta-propylene glycol, or mixtures thereof. In one embodiment, the polyol includes diethylene glycol In one embodiment, the polyol includes alkylene glycol, for example, methylene glycol, ethylene glycol, propylene glycol, or the like. The alkylene group of the alkylene glycol may be substituted or not substituted. In embodiments, the alkylene glycol may be substituted with a lower alkyl having from about 1 to about 5 carbon atoms.

Examples of diisocyanate include aliphatic or aromatic diisocyanates. The aliphatic diisocyanate may contain from about 1 to about 20 carbon atoms, from about 3 to about 15 carbon atoms, or from about 2 to about 8 carbon atoms. The aliphatic diisocyanate may contain from about 1 to about 20 carbon atoms, from about 3 to about 15 carbon atoms, or from about 2 to about 8 carbon atoms. In embodiments, the diisocyanate may be, 2,4-TDI (2,4-toluene diisocynate), HDI (1,6-hexamethylene diisocyanate), or TMHDI (a mixture of 2,4,4- and 2,2,4-trimethylhexamethylene diisocyanate isomers) or a mixture thereof.

Scheme 1 below demonstrates the formation of a cross-linked polyurethane polymer matrix according to one embodiment of the present disclosure.

Scheme 1

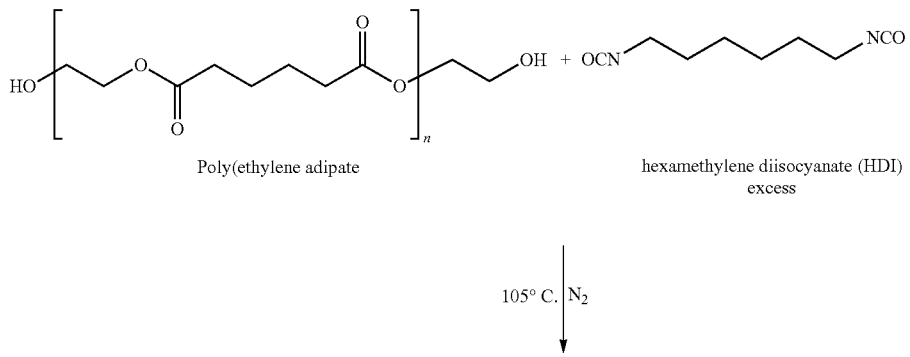

Poly(ethylene adipate)         hexamethylene diisocyanate (HDI)
excess

105° C. | $N_2$

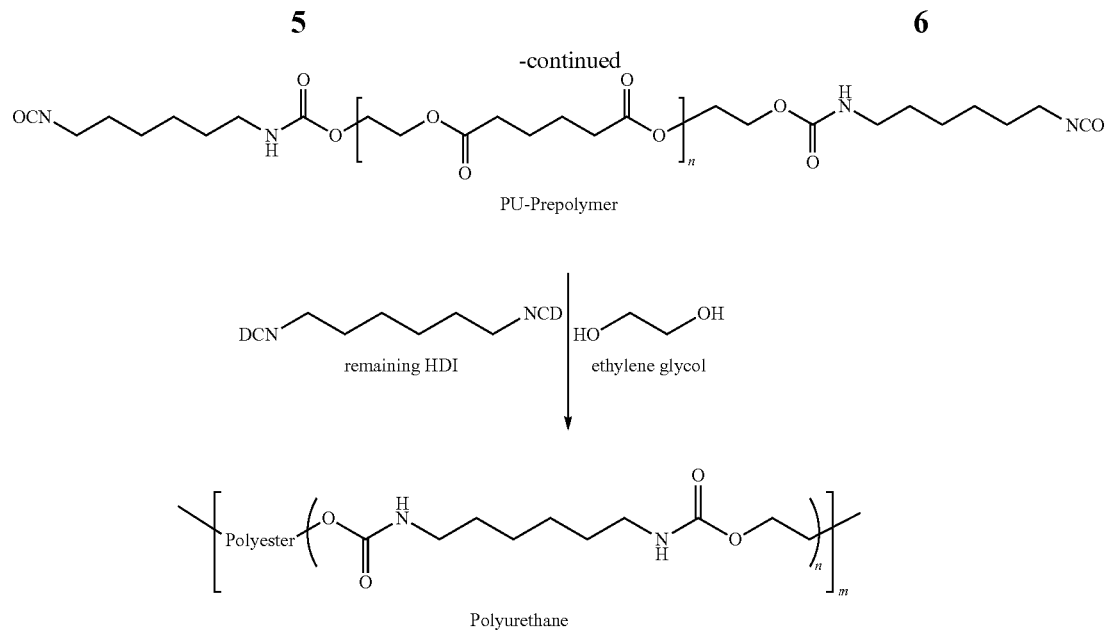

PU-Prepolymer remaining HDI | ethylene glycol

Polyurethane

Phenol-methanal

In embodiments, the cross-linked polymer matrix includes a phenol-methanal. One of the first and second reactive latexes may include phenol and the other one of the first and second reactive latexes may include methanal. The mole ratio of phenol to methanal can vary continuously from about 0.5:1 to about 2:1, from about 0.5:1 to about 1:1, or from about 1:1 to about 2:1.

Scheme 2 below demonstrates the formation of a cross-linked phenol-methanal polymer matrix according to one embodiment of the present disclosure.

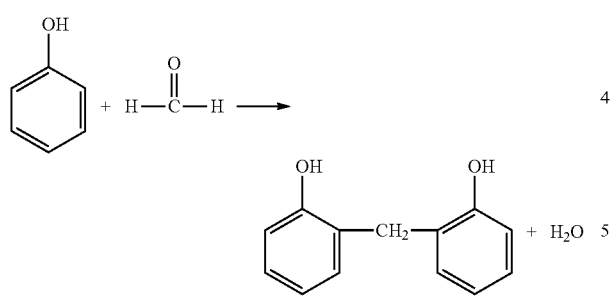

Scheme 2

Urea-formaldehyde

In embodiments, the cross-linked polymer matrix includes a urea-formaldehyde. One of the first and second reactive latexes may include urea and the other one of the first and second reactive latexes may include formaldehyde. The mole ratio of urea to formaldehyde can vary continuously from about 0.5:1 to about 2:1, from about 0.5:1 to about 1:1, or from about 1:1 to about 2:1.

Scheme 3 below demonstrates the formation of a cross-linked urea-formaldehyde polymer matrix according to one embodiment of the present disclosure.

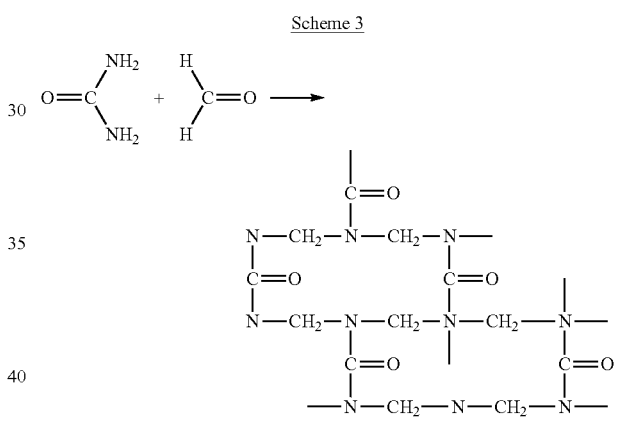

Scheme 3

Melamine-formaldehyde

In embodiments, the cross-linked polymer matrix includes a melamine-formaldehyde. One of the first and second reactive latexes may include melamine and the other one of the first and second reactive latexes may include formaldehyde. The mole ratio of melamine to formaldehyde can vary continuously from about 0.5:1 to about 2:1, from about 0.5:1 to about 1:1, or from about 1:1 to about 2:1.

Scheme 4 below demonstrates the formation of a cross-linked melamine-formaldehyde polymer matrix according to one embodiment of the present disclosure.

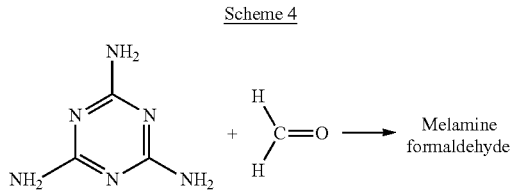

Scheme 4

Epoxides

In embodiments, the cross-linked polymer matrix is derived from the reaction of an epoxide (also know as oxirane) with various nucleophiles, such as hydroxide, amine, and carboxylic acid functional groups. Examples of suitable epoxides include:

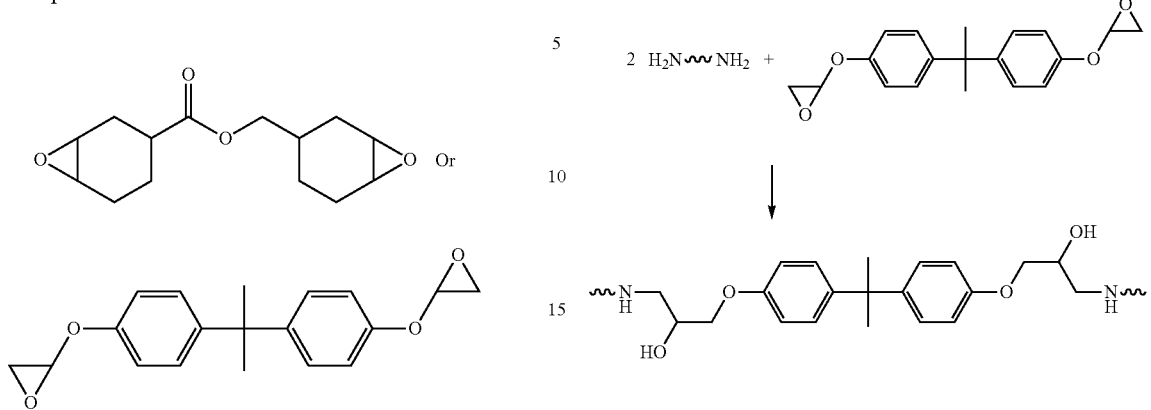

Examples of reactions between amines and epoxides include the reaction shown in Scheme 5a below.

Schemes 5b and 5c below demonstrate the formation of a cross-linked epoxy resin via the reaction of epoxide groups with carboxyl or hydroxide group present in polymers such as poly(styrene-butyl acrylate-methacrylic acid).

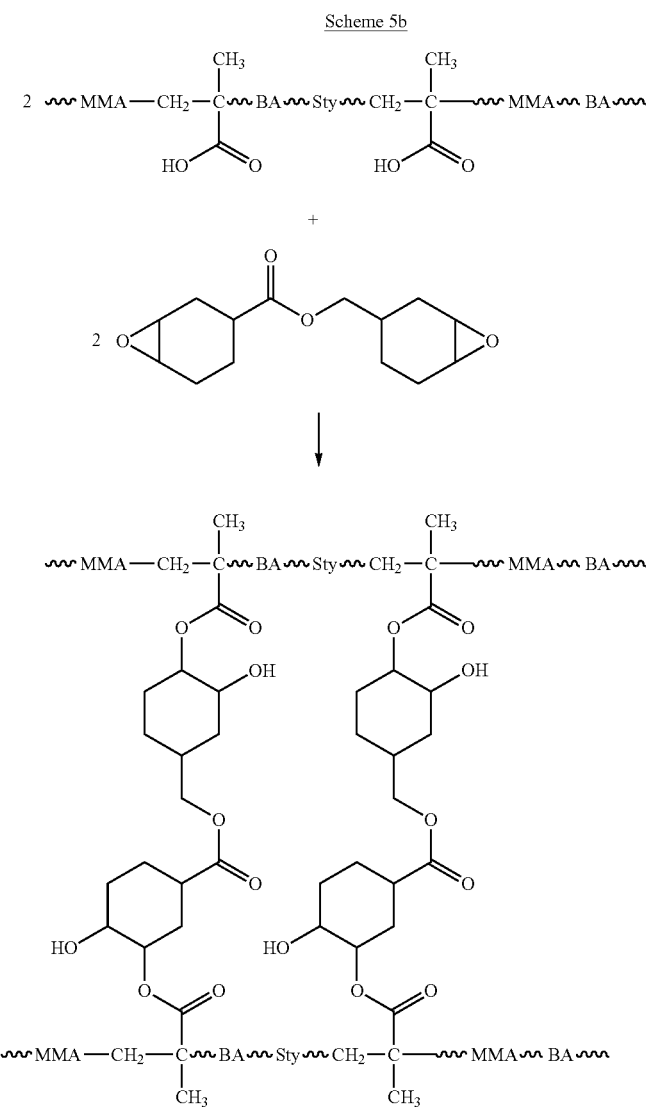

Schemes 5c

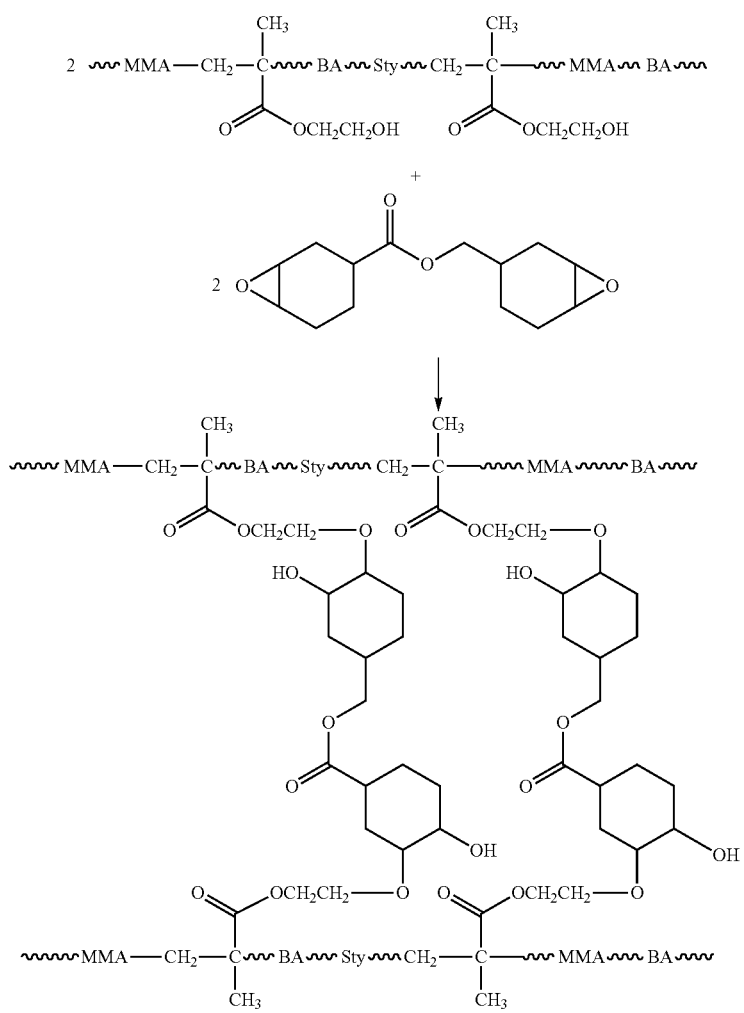

The total reactive latexes are present in an amount of from about 3 to about 20 weight percent, from about 5 to about 18 weight percent, or from about 10 to about 15 weight percent based on the total weight of the ink.

Co-Solvents

The ink compositions may comprise water, or a mixture of water and a water soluble or water miscible organic component, referred to as a co-solvent, humectant, or the like (hereinafter co-solvent) such as alcohols and alcohol derivatives, including aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidone, methoxylated glycerol, ethoxylated glycerol, and mixtures thereof. When mixtures of water and water soluble or miscible organic liquids are selected as the liquid vehicle, the water to organic ratio ranges can be any suitable or desired ration, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The organic component of the ink vehicle can also serve to modify ink surface tension, modify ink viscosity, dissolve or disperse the colorant, and/or affect the drying characteristics of the ink.

In certain embodiments, the co-solvent is selected from the group consisting of sulfolane, methyl ethyl ketone, isopropanol, 2-pyrrolidinone, polyethylene glycol, and mixtures thereof.

Colorants

The ink composition herein may also contain a colorant. Any suitable or desired colorant can be used in embodiments herein, including pigments, dyes, dye dispersions, pigments dispersions, and mixtures and combinations thereof.

The colorant may be provided in the form of a colorant dispersion. In embodiments, the colorant dispersion has an average particle size of from about 20 to about 500 nanometers (nm), or from about 20 to about 400 nm, or from about 30 to about 300 nm. In embodiments, the colorant is selected from the group consisting of dyes, pigments, and combinations thereof, and optionally, the colorant is a dispersion comprising a colorant, an optional surfactant, and an optional dispersant.

As noted, any suitable or desired colorant can be selected in embodiments herein. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; and the like, as well as mixtures thereof.

Examples of suitable pigments include black pigments, white pigments, cyan pigments, magenta pigments, yellow pigments, or the like. Further, pigments can be organic or inorganic particles. Suitable inorganic pigments include carbon black. However, other inorganic pigments may be suitable such as titanium oxide, cobalt blue ($CoO-Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The colorant can be present in the ink composition in any desired or effective amount, in embodiments, the colorant can be present in an amount of from about 0.05 to about 15 percent, or from about 0.1 to about 10 percent, or from about 1 to about 5 percent by weight, based on the total weight of the ink composition.

Ink Composition Preparation and Use

The inks of embodiments may be prepared by any suitable technique and process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in one embodiment from about 5 to about 10 minutes. Alternatively, the optional ink additives can be mixed with the other ink ingredients during the ink preparation process, which takes place according to any desired procedure, such as by mixing all the ingredients, heating if desired, and filtering. Further examples of ink preparation methods are set forth in the Examples below.

The ink compositions described herein may be jetted at temperatures of less than about 100° C., such as from about 25° C. to about 100° C., or from about 30° C. to about 90° C. The ink compositions are thus ideally suited for use in piezoelectric ink jet devices.

The ink compositions can be employed in indirect (offset) printing ink-jet applications, wherein when droplets of the melted ink are ejected in an imagewise pattern onto a recording substrate, the recording substrate is an intermediate-transfer member and the ink in the imagewise pattern is subsequently transferred from the intermediate-transfer member to a final recording substrate.

The ink compositions are suited for jetting onto an intermediate-transfer substrate, e.g., an intermediate-transfuse drum or belt. In a suitable design, the image may be applied by jetting appropriately colored ink compositions during, e.g., four to eighteen rotations (incremental movements) of the intermediate-transfuse member with respect to the ink-jet head, i.e., there is a small translation of the printhead with respect to the substrate in between each rotation. This approach simplifies the printhead design, and the small movements ensure good droplet registration. Transfuse, i.e., a transfer and fusing step, is desirable in forming the image as transfuse enables a high quality image to be built up on a rapidly rotating transfer member. Transfuse typically involves jetting the ink composition from the ink-jet head onto an intermediate-transfer member such as a belt or drum, i.e., the transfuse member. This allows the image to be rapidly built onto the transfuse member for subsequent transfer and fusing to an image-receiving substrate. Alternatively, the same image build-up can be carried out directly on the image substrate, for example, paper.

The disclosure provides an indirect printing system comprising an intermediate receiving member for receiving jetted ink; a holding arrangement for holding a dual-component ink adjacent to the intermediate receiving member. The dual-component ink includes a first component comprising a first reactive latex having a first crosslinkable functional group and a second component comprising a second reactive latex a second crosslinkable functional group. The holding arrangement further includes a first container for holding the first component and a second container for holding the second component. The indirect printing system may include one or more inkjet nozzles formed in contact with the first and second containers for jetting the dual-component ink, where the first and second components may be jetted onto the intermediate receiving member so that the first and second components of the dual-component ink are mixed to react the first reactive latex with the second reactive latex to form a cross-linked polymer matrix. In embodiments, the first component may be jetted onto the intermediate receiving member and the second component may be subsequently jetted onto the intermediate receiving member so that the first and second components of the dual-component ink are mixed to react the first reactive latex with the second reactive latex to form a cross-linked polymer matrix. The indirect printing system may also include a heater device for removing water from the ink.

When an indirect-printing process is used, the intermediate-transfer member can be of any desired or suitable configuration, such as a drum or roller, a belt or web, a blanket, a flat surface or platen, or the like. The temperature of the intermediate-transfer member can be controlled by any desired or suitable method, such as by situating heaters in or near the intermediate-transfer member, using air flow to dry the transfer member, or the like.

It will be appreciated that varies of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Polymeric Resins

Any suitable polymer resin can be used. Possible resins are polyesters that are amorphous and crystalline in nature or mixture of both. A suitable amorphous polyester resin may be a copoly(propoxylated bisphenol A co-fumarate)-copoly (propoxylated bisphenol A co-terephthalate) resin (Amorphous polyester X) having the following formula (I):

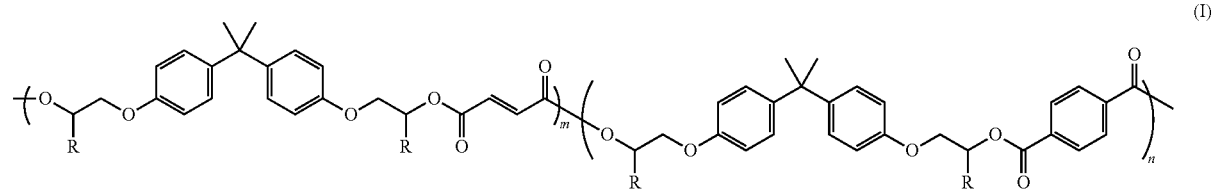

(I)

wherein R may be hydrogen or a methyl group, and m and n represent random units of the copolymer and m may be from about 2 to 10, and n may be from about 2 to 10. Suitable crystalline polyester resins may include a resin formed from ethylene glycol and a mixture of dodecanedioic acid and fumaric acid co-monomers (Crystalline polyester Y) with the following formula:

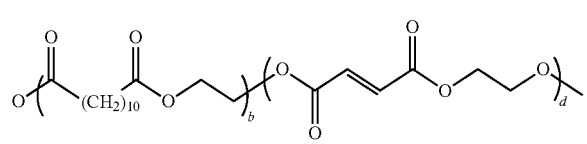

(II)

wherein b is from about 5 to about 2000 and d is from about 5 to about 2000.

Table 1 below shows the properties of the polyester resins.

TABLE 1

Polyester Resins

| Resins | Mw (g/mol) | Mn (g/mol) | PDI (Polydispersity Index) | Acid number | Mp (° C.) | Tg onset (° C.) |
|---|---|---|---|---|---|---|
| Amorphous polyester X | 19,388 | 5,003 | 3.88 | 14.71 | — | 60.5 |
| Crystalline polyester Y | 23,337 | 10,570 | 2.21 | 9.06 | 71 | |

In one embodiment, the polyester resins include amorphous polyester X. In one embodiment, the polyester latexes include crystalline polyester Y. The properties of the amorphous polyester X and the crystalline polyester Y are listed below.

Table 2 below shows the components of the prophetic Ink Formulation 1A.

TABLE 2

Prophetic Ink Formulation 1A

| Component | Function | desired solids wt % | wt % concentration in material, dispersion or water | wt % material or dispersion required | m(g) |
|---|---|---|---|---|---|
| amorphous polyester X + 1,12-dodecanediamine | amorphous latex + 1 component of reactive pair | 8 | 34.2 | 23.39 | 11.70 |
| crystalline polyester Y | crystalline polyester latex | 2 | 35.6 | 5.62 | 2.81 |
| sulfalone (5% water) | humectant | 15.84 | 95 | 16.67 | 8.335 |
| 2-pyrrolidinone | humectant | 3.33 | 100 | 3.33 | 1.665 |
| PEO (Mw 20k) | viscosity modifier | 0.72 | 100 | 0.72 | 0.36 |
| Carbon black 300 | pigment dispersion | 3.3 | 14.87 | 22.19 | 11.095 |
| BYK 347 | silicone surfactant | 0.16 | 100 | 0.16 | 0.08 |
| water | solvent | | | Balance | balance |
| TOTAL | | | | 100 | 50 |

Table 3 below shows the components of the prophetic Ink Formulation 1B.

TABLE 3

Prophetic Ink Formulation 1B

| Component | Function | desired solids wt % | wt % concentration in material, dispersion or water | wt % material or dispersion required | m(g) |
|---|---|---|---|---|---|
| amorphous polyester X + bisphenol A diglycidyl ether | amorphous latex + 1 component of reactive pair | 8 | 35.92 | 22.27 | 11.14 |
| crystalline polyester Y | crystalline polyester latex | 2 | 35.6 | 5.62 | 2.81 |
| sulfalone (5% water) | humectant | 15.84 | 95 | 16.67 | 8.335 |
| 2-pyrrolidinone | humectant | 3.33 | 100 | 3.33 | 1.665 |
| PEO (Mw 20k) | viscosity modifier | 0.72 | 100 | 0.72 | 0.36 |
| Carbon black 300 | pigment dispersion | 3.3 | 14.87 | 22.19 | 11.095 |
| BYK 347 | silicone surfactant | 0.16 | 100 | 0.16 | 0.08 |
| water | solvent | | | Balance | balance |
| TOTAL | | | | 100 | 50 |

Example 2

Prophetic Example

Preparation of a Reactive Latex for Ink 1A 190 g of amorphous polyester X and 15 g of 1,12-dodecanediamine are weighed out in a 1 L kettle. 100 g of methyl ethyl ketone (MEK) and 40 g of iso-propanol (IPA)

are weighed out separately and mixed together in a beaker. The solvents are poured into the 1 L kettle containing the resin. The kettle, with its cover on, a gasket, a condenser and 2 rubber stoppers, is placed inside a water bath set at 48° C. (ensure Tr close to 45-46° C.) for 1 hour until the resins become "soft". The anchor blade impeller is set up in the kettle and is switched on to rotate at approximately 150 RPM. After 3 hours, when all of the resins have dissolved, 8.69 g of 10% NH4OH is added to the mixture dropwise with a disposable pipette through a rubber stopper. The mixture is left to stir for 10 minutes. 600 g of de-ionized water (DIW) is to be added into the kettle by a pump through a rubber stopper. The first 400 g are added in 90 minutes with the pump set to a rate of about 4.4 g/min. The last 200 g are added in 30 minutes with the pump set to about 6.7 g/min. The apparatus is dismantled, and the mixture is poured into a glass pan, which is kept in the fume hood overnight and stirred by a magnetic stir-bar so that the solvent can evaporate off.

Example 3

Prophetic Example

Formulation of Ink 1A

To a 50 mL amber glass vial is added surfactant and carbon black dispersion, while the mixture is stirred with a magnetic stir bar at 200 RPM, water (~20% to wash latex beaker) was slowly added. The pH of the latex (prepared above for Ink 1A) was separately adjusted to about 6.8 and then slowly added to vial which was chased with 20% water to clean latex residuals. The ink was then homogenized for 5 minutes at 2,000 RPM.

Example 4

Prophetic Example

Preparation of a Reactive Latex for Ink 1B

The procedure outlined above is repeated, replacing 1,12-dodecanediamine with 25.5 g of Bisphenol A diglycidyl ether.

Example 5

Prophetic Example

Formulation of Ink 1B

The procedure outlined above is repeated, replacing the reactive latex prepared for ink 1A with the one prepared for ink 1B.

Based on experimental data disclosed in co-pending U.S. patent application Ser. No. 14/066,716, entitled "INK JET INK FOR INDIRECT PRINTING APPLICATIONS,", and U.S. patent application Ser. No. 14/067,469, entitled "INKJET INK CONTAINING POLYSTYRENE COPOLYMER LATEX SUITABLE FOR INDIRECT PRINTING," and known monomer properties, prophetic ink formulations 1A and 1B are predicted to demonstrate suitable viscosity (5-20 cps) and surface tension (20-22 mN/m) for jetting.

Formulations 1A and 1B are applied sequentially via inkjet 1a and 1b onto an intermediate receiving member 4 (e.g., a drum) having a surface energy of less than the liquid ink surface tension. The jetted image is heated by a heater device 3 to remove water and induce mixing of the two reactive latexes. At this point the latexes react with one another to form an ink film. The film is transferred to the final substrate 10, resulting in a robust image. Image robustness is especially important for packaging applications such as folding carton, for example.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A dual component ink for use in an indirect printing process comprising:
   a first component ink comprises a first reactive latex having a first crosslinkable functional group; and
   a second component ink comprises a second reactive latex having a second crosslinkable functional group, wherein the first reactive latex can react with the second reactive latex to form a cross-linked polymer matrix when in contact with each other, wherein the cross-linked polymer matrix is selected from the group consisting of a polyurethane, a phenol-methanal, an urea-formaldehyde, a melamine-formaldehyde, and an epoxide,
   wherein the first component ink and the second component ink each further comprising a colorant selected from the group consisting of pigment, dye, mixtures of pigment and dye, mixtures of pigments, and mixtures of dyes;
   wherein the first reactive latex and the second reactive latex are not in contact with each other.

2. The dual component ink of claim 1, wherein one of the first and second reactive latexes comprises polyol and the other one of the first and second reactive latexes comprises diisocyanate.

3. The dual component ink of claim 2, wherein the polyol comprises alkylene glycol.

4. The dual component ink of claim 2, wherein the diisocyanate comprises aliphatic diisocyanates.

5. The dual component ink of claim 1, wherein one of the first and second reactive latexes comprises phenol and the other one of the first and second reactive latexes comprises methanal, and further wherein the cross-linked polymer matrix is a phenol-methanal.

6. The dual component ink of claim 1, wherein one of the first and second reactive latexes comprises urea and the other one of the first and second reactive latexes comprises formaldehyde, and further wherein the cross-linked polymer matrix is an urea-formaldehyde.

7. The dual component ink of claim 1, wherein one of the first and second reactive latexes comprises melamine and the other one of the first and second reactive latexes comprises formaldehyde, and further wherein the cross-linked polymer matrix is a melamine-formaldehyde.

8. The dual component ink of claim 1, wherein the mole ratio of the first reactive latex to the second reactive latex is from about 0.5:1 to about 2:1.

9. The dual component ink of claim 1, wherein the first component ink having a surface tension of from about 15 to about 50 mNm and the second component ink having a surface tension of from about 15 to about 50 mNm.

10. The dual component ink of claim 1, wherein the first component ink having a viscosity of from about 2 centipoise to about 20 centipoise at 30° C. and the second component ink having a viscosity of from about 2 centipoise to about 20 centipoise at 30° C.

11. The dual component ink of claim 1, wherein the first component ink and the second component ink each further comprising a humectant.

12. An indirect printing system comprising:
an intermediate receiving member for receiving jetted ink;
a holding arrangement that is holding a dual-component ink adjacent to the intermediate receiving member, wherein the dual-component ink comprises a first component ink comprising a first reactive latex having a first crosslinkable functional group and a second component ink comprising a second reactive latex having a second crosslinkable functional group, wherein the first reactive latex can react with the second reactive latex to form a cross-linked polymer matrix when in contact with each other, wherein the cross-linked polymer matrix is selected from the group consisting of a polyurethane, a phenol-methanal, an urea-formaldehyde, a melamine-formaldehyde, and an epoxide, wherein the first component ink and the second component ink each further comprising a colorant selected from the group consisting of pigment, dye, mixtures of pigment and dye, mixtures of pigments, and mixtures of dyes; and the holding arrangement further comprises a first container that is holding the first component ink and a second container that is holding the second component ink;
one or more inkjet nozzles formed in contact with the first and second containers for jetting the dual-component ink, so that both the first and second components are jetted onto the intermediate receiving member and mixed to react the first reactive latex with the second reactive latex to form a cross-linked polymer matrix, wherein the cross-linked polymer matrix is selected from the group consisting of a polyurethane, a phenol-methanal, an urea-formaldehyde, a melamine-formaldehyde, and an epoxide; and
a heater device for heating the cross-linked polymer matrix.

13. The indirect printing system of claim 12, wherein the first component ink is jetted onto the intermediate receiving member and the second component ink is subsequently jetted onto the intermediate receiving member.

14. A method of printing with an aqueous ink comprising:
a) providing a dual component ink comprising; a first component ink comprises a first reactive latex having a first crosslinkable functional group, and a second component ink comprises a second reactive latex having a second crosslinkable functional group, wherein the first reactive latex can react with the second reactive latex to form a cross-linked polymer matrix when in contact with each other, wherein the first reactive latex and the second reactive latex are not in contact with each other; wherein the first component ink and the second component ink each further comprising a colorant selected from the group consisting of pigment, dye, mixtures of pigment and dye, mixtures of pigments, and mixtures of dyes;
b) applying the first reactive latex through a first inkjet to an intermediate substrate, and applying the second reactive latex through a second inkjet to the intermediate substrate;
c) reacting the first reactive latex and the second reactive latex to form an ink film comprising a cross-linked polymer matrix, wherein the cross-linked polymer matrix is selected from the group consisting of a polyurethane, a phenol-methanal, an urea-formaldehyde, a melamine-formaldehyde, and an epoxide; and
d) transferring the ink film from the intermediate substrate to a final substrate.

15. The method of claim 14, wherein the first reactive latex and the second reactive latex is mixed together on the intermediate substrate.

16. The method of claim 14, wherein the cross-linked polymer matrix is selected from the group consisting of a polyurethane, a phenol-methanal, an urea-formaldehyde, a melamine-formaldehyde, and an epoxide.

17. The method of claim 14, wherein the ink has a surface tension of from about 15 to about 50 mNm.

18. The method of claim 14, wherein the ink has a viscosity of from about 2 centipoise to about 20 centipoise at 30° C.

* * * * *